United States Patent [19]
Beer

[11] 4,260,496
[45] Apr. 7, 1981

[54] FILTRATION PROCESS AND APPARATUS

[75] Inventor: Ekkehard Beer, Bad Schwalbach, Fed. Rep. of Germany

[73] Assignee: Hoechst Aktiengesellschaft, Frankfurt am Main, Fed. Rep. of Germany

[21] Appl. No.: 79,481

[22] Filed: Sep. 17, 1979

[30] Foreign Application Priority Data

Oct. 4, 1978 [DE] Fed. Rep. of Germany ....... 2843307

[51] Int. Cl.$^3$ ............................................. B01D 33/18
[52] U.S. Cl. ............................... 210/780; 210/323.2; 210/387; 100/37; 100/120
[58] Field of Search ........................ 100/37, 118–120; 210/10, 323.2, 65–67, 77, 415, 497.1, 386, 387

[56] References Cited

U.S. PATENT DOCUMENTS

| | | | |
|---|---|---|---|
| 2,864,506 | 12/1953 | Hiskey | 210/321 |
| 2,884,062 | 4/1959 | Taylor | 100/120 |
| 3,399,778 | 9/1968 | O'Neill | 210/387 |
| 3,523,077 | 8/1970 | Camirand et al. | 210/65 |
| 3,527,698 | 9/1970 | Von Reppert et al. | 210/10 |
| 3,747,766 | 7/1973 | Brooks | 210/304 |
| 4,039,450 | 8/1977 | Brown | 210/77 |
| 4,101,423 | 7/1978 | Merrill et al. | 210/497.1 |
| 4,173,249 | 11/1979 | Holkko et al. | 100/118 |

FOREIGN PATENT DOCUMENTS

| | | |
|---|---|---|
| 2009155 | 9/1970 | Fed. Rep. of Germany . |
| 2525126 | 1/1977 | Fed. Rep. of Germany . |
| 2546500 | 4/1977 | Fed. Rep. of Germany . |
| 2201110 | 4/1974 | France . |
| 2281783 | 3/1976 | France . |
| 2383130 | 11/1978 | France ................................. 210/323.2 |
| 7705716 | 11/1977 | Netherlands ............................ 210/387 |
| 94019 | 4/1922 | Switzerland . |
| 1256491 | 12/1971 | United Kingdom . |
| 1372827 | 11/1974 | United Kingdom .................. 210/323.2 |

*Primary Examiner*—Benoît Castel
*Attorney, Agent, or Firm*—Schwartz, Jeffery, Schwaab, Mack, Blumenthal & Koch

[57] ABSTRACT

Disclosed is a filtration process for separating solid, sludge-like and dissolved constituents from effluent, comprising the steps of introducing under an elevated pressure the effluent into a tube-shaped filter having a closed end and an open end, the tube-shaped filter being comprised of a semi-permeable material, the point of introduction of the effluent being initially near the closed end of the filter; moving the point of introduction of the effluent away from the closed end and toward the open end of the filter; and adjusting the rate of introduction of the effluent into the filter to achieve a predetermined content of solids in the concentrate remaining inside the filter. Also disclosed is a device for carrying out this process.

19 Claims, 9 Drawing Figures

Fig.5
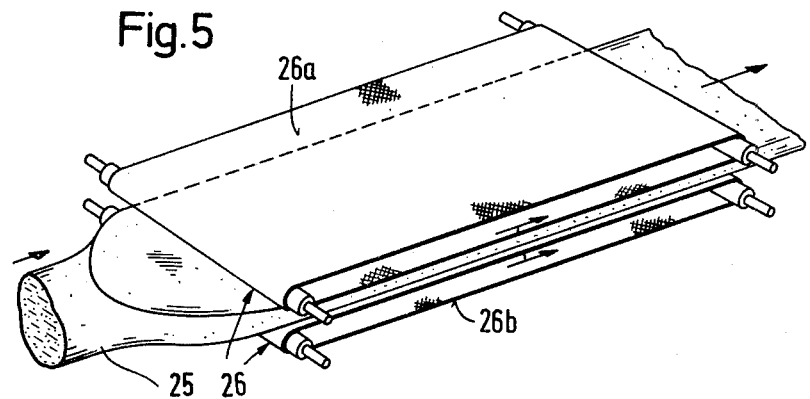
Fig.6
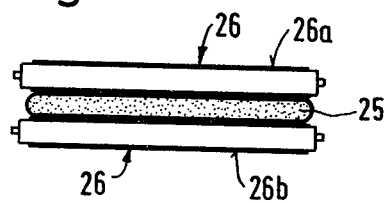
Fig.7 Fig.8 Fig.9
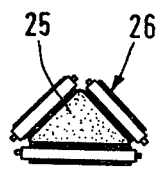 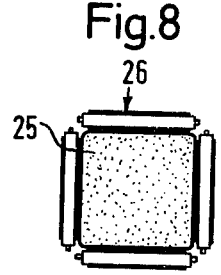 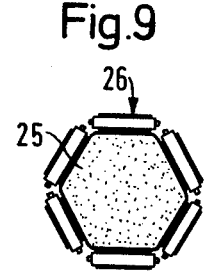

FILTRATION PROCESS AND APPARATUS

BACKGROUND OF THE INVENTION

The present invention relates to a process and to an arrangement for separating solid, sludge-like constituents and dissolved constituents from effluent and to a method of using semi-permeable filters in the form of tubing. Sludge-like constituents are also to be understood to include gel-like and colloidal media.

The purification of effluent, carried out generally in treatment plants, is effected via a sequence of process steps, such as, for example, neutralization of acid or alkaline effluents, pre-clarification in settling basins to remove solids as a pre-clarification sludge, biological purification using suspension of bacteria with the introduction of oxygen, and chemical clarification by coagulation of colloid-disperse substances.

A multiplicity of process steps is usually necessary for separating solid or sludge-like constituents from effluent. Thus, for example, the pre-clarification sludge initially obtained from the settling basin is subsequently concentrated in thickener basins, the thin sludge which settles in the thickener basin is dehydrated by means of centrifuges, after organic flocculating agents have been added, and only the thick sludge which has been separated off can be burned or converted into compost.

It is known from German Offenlegungsschrift No. 2,331,118 to dehydrate thick sludge, for example, with the aid of sludge filters in the form of tubing consisting of a synthetic fabric. However, raising the concentration of effluent or of sludges having a solids content of less than about 30% by weight, in particular less than 10% by weight, in an economical manner, using these devices is as a rule not possible. In these cases, a sufficiently thick filter cake, enriched in solids from the effluent, cannot be formed. In particular, when working without filter aids, the pores of the filters can be blocked even after a short time. Moreover, filters of a synthetic fabric are suitable only for separating macro-particles. The filtrate obtained is usually turbid and has a high solids content. Because of the high residual water content, the fabric tubing filled with sludge is less suitable for storage and/or combustion.

SUMMARY OF THE INVENTION

It is therefore an object of the present invention to simplify and to accelerate the separation and concentration of sludges from effluent.

It is a further object of the invention to provide an improved process for separating solid, sludge-like constituents, and dissolved constituents from effluent.

Another object of the invention resides in the provision of an improved arrangement or plant for carrying out the process according to the invention.

In accomplishing the foregoing objects, there has been provided in accordance with the present invention a filtration process for separating solid, sludge-like and dissolved constituents from effluent, comprising the steps of introducing under an elevated pressure of preferably from about 1 to 10 bars the effluent into a tube-shaped filter having a closed end and an open end, the tube-shaped filter being comprised of a semi-permeable material, the point of introduction of the effluent being initially near the closed end of the filter; moving the point of introduction of the effluent away from the closed end and toward the open end of the filter either continuously or stepwise; and adjusting the rate of introduction of the effluent into the filter to achieve a predetermined content of solids in the concentrate remaining inside the filter.

In accordance with another aspect of the present invention, there has been provided a filtration device for separating solid, sludge-like and dissolved constituents from effluent, comprising: a filling tube; a pump for introducing effluent into the filling tube under an elevated pressure; a tube-shaped filter having a closed end and an open end which surrounds the filling tube, the tube-shaped filter being comprised of a semi-permeable material; and means for moving the filter with respect to the filling tube, so that the closed end of the filter moves away from the filling tube. Preferably, the device further comprises at least two elements for shaping the periphery of the filled filter.

Further objects, features and advantages of the present invention will become apparent from the detailed description of certain preferred embodiments which follows, when considered in light of the attached drawings.

BRIEF DESCRIPTION OF THE DRAWINGS

In the drawings:

FIG. 5 is a perspective view illustrating a filled tubing being transported, shaped and supported by rotating conveyor belts; and FIGS. 6 to 9 are endviews schematically illustrating filled tubing being transported, shaped and supported by revolving conveyor belts.

DETAILED DESCRIPTION OF PREFERRED EMBODIMENTS

Figure 1:
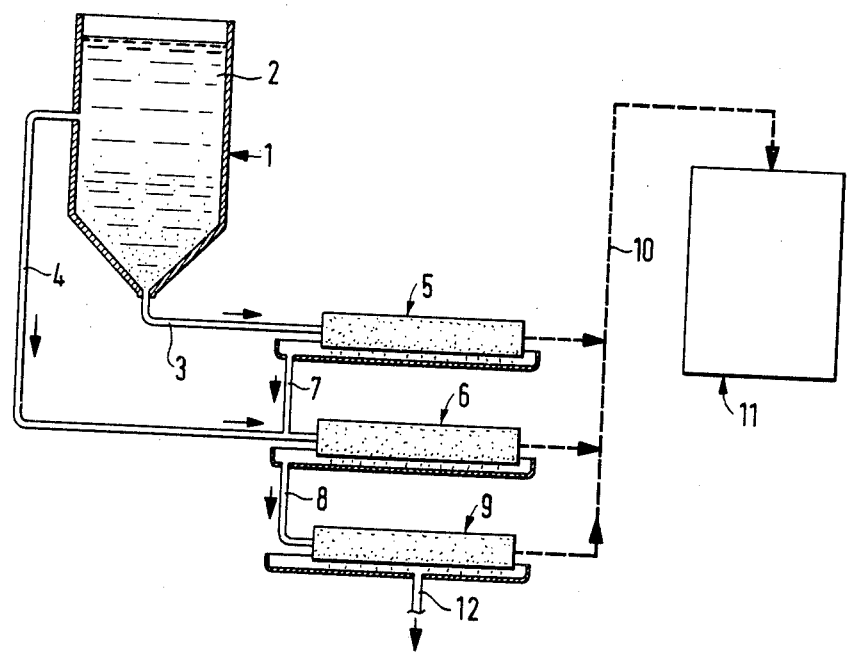
FIG. 1 schematically illustrates the general process of purifying effluent in a thickener basin and of treating the decanted liquid and the thick sludge.

According to the present invention, the effluent which is to be purified is filled into one or more filters in the form of tubing, without pre-clarification or after pre-clarification. At least one filter consists of a semi-permeable material. The filtrate passes through the filter wall and is led away, while the solid or sludge-like constituents of the effluent are collected on the inner surface of the tube-shaped filter. If a pre-clarification step takes place, the pre-clarification sludge obtained or the thin sludge obtained in the thickener can also be treated in accordance with the present invention.

Multi-stage purification of the effluent, using several tube-shaped filters which are arranged in series and which progressively each have a smaller average pore diameter and a smaller diameter, is advisable if the diameters of the solids particles are spread over a wide range, for example, from about 0.001 to 1 micron. This multi-stage purification also makes large throughput capacities possible.

To improve the separation effect, the effluent or the sludge is treated with customary precipitants and/or flocculents. Hydrophobic materials, such as fats or oily substances, are bound by special chemicals of the type which are conventional in the purification of effluent.

As a result of adding porous filter aids, such as ash, coke fines or wood flower, passage paths for the emerging liquid are maintained within the concentrate.

As a result of using at least one tube-shaped filter made of a semi-permeable material, an optimum increase in the filtration capacity is achieved according to the invention. Advantageously, the outer wall of the filter is in contact with a solution, in particular a salt solution, and the concentration of dissolved materials in this solution is greater than the concentration of the dissolved materials in the filter tubing.

The present process thus works on the basis of the natural osmotic equilibrium and is used, for example, for the treatment of sludges which are obtained in industry and which, after drying and removing certain materials, can be used again in production.

The filter materials used are, for example, papers, non-woven and/or woven fabrics. The semi-permeable filter consists of a customary membrane of high strength and chemical stability, for example, of polyamide, polysulfone or regenerated cellulose, and such a filter makes possible the separation of relatively small solid particles, for example, particles smaller than 1 micron.

The diameter of the semi-permeable tubing can vary within wide ranges, in particular from about 10 to 500 mm. The choice of an optimum diameter of the tubing depends above all on the maximum possible thickness of the filter cake or on the rise in concentration; these are a function of the nature of the effluent. For media which can readily be filtered, the diameter of the tubing is as large as possible. Preferably, the diameter of the tubing corresponds approximately to twice the maximum possible thickness of the filter cake.

The effluent or sludge is introduced under a pressure of from about 1 to 10, in particular from about 2 to 5 bars, into the tube-shaped semi-permeable filter with the effluent or sludge being transported via a filling tube into a filter by means of a conveyor device, for example, a pump or screw.

The filter is pushed over the filling tube and, during filling, it is drawn continuously or stepwise off the filling tube, preferably in a horizontal direction, with only the section of tubing between the beginning of the tubing and the opening of the filling tube being filled. The beginning of the tubing, that is to say, that part of the tube-shaped filter which is drawn off the filling tube, is closed, while the end of the filter is fixed to the filling tube. This procedure has the advantage that the tube-shaped filter is not filled in a single step over the entire length, but is filled continuously or stepwise.

The movement of the filter away from the filling point is effected by the pressure, which is exerted by the mass being introduced, and by a conveyor device running at a speed adapted to the throughput capacity. Preferably, the movement away from the filling point is started as soon as the optimum concentration has been reached in that part of the filter which is filled with effluent or sludge. The draw-off speed of the filter from the filling tube is thus related to the filtration output of the filter and is particularly high in the case of media which can readily be filtered.

A further conveyor device can at the same time take over the function of a shaping element and/or a supporting element, which imparts a preferred cross-sectional shape to the filled, tube-shaped filter and supports the filter against the excess pressure acting from the inside. The conveyor devices permit a uniform advance of the tubing or uniform drawing of the tubing from the filling tube. The second conveyor device consists, for example, of revolving conveyor belts of perforated or absorbent material, for example, of metal bands having a sponge layer on the surface. For example, it is also possible to deliver, support and shape the tube-shaped filter by means of tubular fabric, tubular netting, a porous support tube or screen netting. The arrangement of these devices influences the thickness of solid in the interior of the tube-shaped filter, the filtration resistance and the filtration rate. In the case of effluents or sludges which are difficult to filter and which allow only a small thickness of solid in the interior of the filter, or if only a low internal pressure is permissible, the filter is guided between only two parallel conveyor belts which travel horizontally, and the distance between the belts is preferably selected in such a way that the tube-shaped filter is largely laid flat. If, however, due to the nature of the solids which are to be separated, thicker layers of solid are formed on the inner wall of the filter, without an excessive reduction in the throughput of the filter, or if a relatively high working pressure is applied, the tube-shaped filter is supported on all sides to the extent possible.

After the desired solids concentration and a certain maximum length of tubing have been reached in the tube-shaped filter, the still-open end of the filter is closed, for example, by tying with string or with metal clamps, and a further influx of effluent or sludge is prevented, for example, by a shut-off device on the filling tube. Shutting-off of the two openings of the tube-shaped filter can also be accomplished by continuing filtration until a highly viscous concentrate is obtained, in which case the plug of solids formed closes the ends of the tubing and creates sufficient resistance against the effluent or sludge which follows. These procedures make it possible to remove the concentrate in portions from the arrangement, and the filter cover here serves as packaging and makes it possible, in particular, to store and to transport hazardous substances or substances having an unpleasant odor.

The tubing closed at both ends and largely filled with dehydrated sludge is—if necessary after further comminution—passed to a composting stage or it is burned. In the case of sludges with a high content of organic solids, a concentration can be reached which is sufficiently high that the energy liberated on combustion is sufficient to vaporize residual water which is still present and to maintain the combustion self-sustaining.

Preferably, the filter is a shirred tubing of a flexible material, for example, of regenerated cellulose. It is manufactured by folding and compressing along the longitudinal axis, the length of the tubular filter in the shirred state advantageously being no more than from about 1 to 3% of its actual extended length. When the shirred filter is drawn off the filling tube during the filling procedure, the shirred part is unfolded continuously or stepwise. Devices and processes for the manufacture of shirred tubing are known and are described, for example, in U.S. Pat. No. 2,983,949 and No. 2,984,574, the disclosure of which is hereby incorporated by reference.

In another advantageous embodiment, the tube-shaped filter is formed in situ immediately before filling, for example, upstream of the filling tube, from a tape which is spirally wound. The overlapping edges of the tape are joined to one another by gluing, sealing or welding. It is also possible to form tubing in this manner from a tape, the opposite edges of which overlap along an axially extending longitudinal seam. If, however, a supporting cover of corresponding shape is used, the joining of the overlapping edges is not necessary. After a filtrate has been pressed out, the tape formed in the shape of tubing is opened and the largely dehydrated sludge is removed from the tape after it has been laid flat. The tape is then re-used, if necessary or appropriate after cleaning with the aid of scrapers.

The present process is particularly suitable for separating toxic substances of low or medium molecular weight from the sludge. The semi-permeable filter material only allows the passage of molecules of up to a certain size.

The invention will now be explained in further detail with reference to the drawings. In FIG. 1, the dispersion 2 which is to be treated is separated in a thickener basin 1 into thick sludge 3 and supernatant liquid 4. Both these fractions are passed to tube-shaped filters 5 and 6, respectively. The filtrate 7 from the filter 5 is after-treated by means of the filter 6, and the filtrate 8 from the filter 6 is filtered again by the semi-permeable filter 9. The average pore size and the diameter of the filter 6 are smaller than the pore size and the diameter of the filter 5. The concentrate 10 is passed to combustion chamber 11, and the filtrate 12 constitutes purified, clear water.

Figure 2:
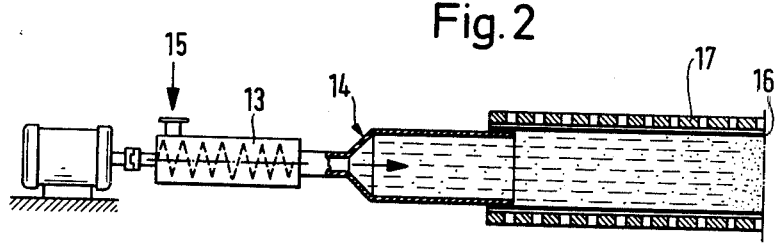
FIGS. 2 to 4 schematically illustrate plant arrangements having a filling branch and various embodiments of tubing.
Figure 3:
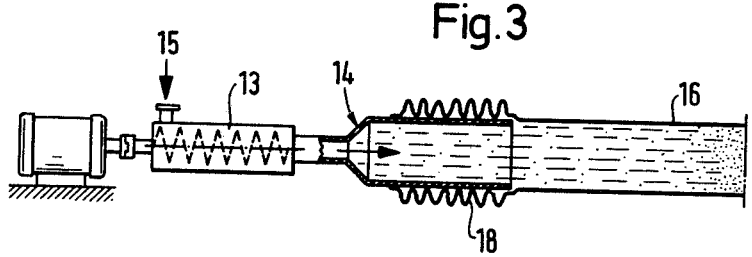
Figure 4:
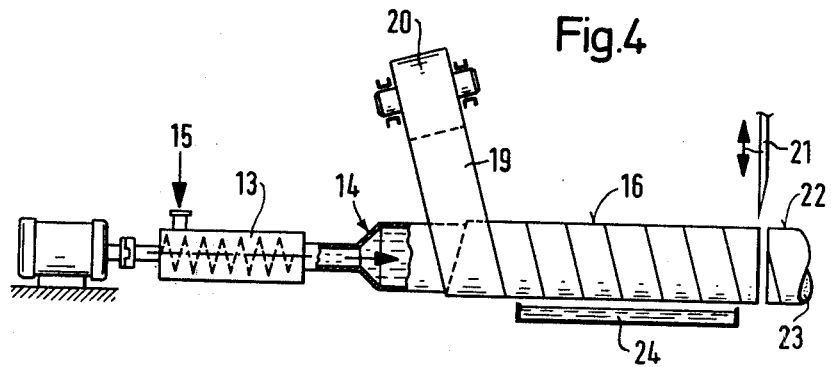

In FIGS. 2 to 4, the dispersion 15 which has been injected by means of a pump 13 through the filling branch 14, is purified in a semi-permeable filter 16 having the shape of tubing. The filter 16 is supported in FIG. 2 by a perforated pipe 17. In FIG. 3, the semi-permeable filter is a shirred tubing 18, while the semi-permeable filter in FIG. 4 comprises tubing 16 formed by winding up a tape 19 from a roll 20. The filter is divided into sections 22 by means of a cutting device 21, and the sections are transportable or can be processed further. The concentrate 23 in the tubing 16 is already so viscous at the cutting point that closing of the end of the tubing with clamps is not necessary. The filtrate is collected in the collection device 24.

In FIG. 5, a filled filter 25 originally having the shape of round tubing is shaped into flat tubing and supported by two conveyor belts 26a and 2b which run parallel one above the other. FIGS. 6 to 9 illustrate sections of the shaped tubing 25 in the alternative embodiments where it is shaped and supported with 2, 3, 4 or 6 conveyor belts 26.

What is claimed is:

1. A filtration process for separating solid, sludge-like and dissolved constituents from effluent, comprising the steps of:
   introducing under an elevated pressure the effluent into a tube-shaped filter having a closed end and an open end, said tube-shaped filter being comprised of a semi-permeable material, the point of introduction of the effluent being initially near the closed end of said filter;
   moving the point of introduction of the effluent away from the closed end and toward the open end of said filter;
   adjusting the rate of introduction of the effluent into said filter to achieve a predetermined content of solids in the concentrate remaining inside of said filter; and
   forming a solid-filled envelope of said filter beginning at said closed end and progressing toward said open end of said filter.

2. A process as claimed in claim 1, wherein the point of introduction is moved continuously.

3. A process as claimed in claim 1, wherein the point of introduction is moved step-wise.

4. A process as claimed in claim 1, wherein the effluent is introduced under a pressure of from about 1 to 10 bars.

5. A process as claimed in claim 1, further comprising the step of supporting said filter.

6. A process as claimed in claim 1, wherein said filter comprises shirred tubing, and wherein said moving step includes unfolding of said shirred filter.

7. A process as claimed in claim 1, further comprising the step of forming said tubing in situ immediately prior to the point of introduction of the effluent.

8. A process as claimed in claim 7, wherein the filter is formed by spirally winding a web of said semi-permeable material and joining the superposed edges of the web to one another.

9. A process as claimed in claim 1, further comprising the step of contacting the outside of the filter with a salt solution.

10. A filtration device for separating solid, sludge-like and dissolved constituents from effluent, comprising:
    a filling tube;
    a pump for introducing effluent into said filling tube under an elevated pressure;
    a tube-shaped filter having a closed end and an open end which surrounds said filling tube, said tube-shaped filter being comprised of a semi-permeable material;
    means for moving said filter with respect to said filling tube, so that the closed end of said filter moves away from said filling tube; and
    means for forming a solid-filled envelope of said filter beginning at said closed end and progressing toward said open end of said filter.

11. A device as claimed in claim 1, wherein the semi-permeable material comprises regenerated cellulose.

12. A device as claimed in claim 10, wherein the filter is shirred in the unfilled state and is unfolded in the filled state.

13. A device as claimed in claim 10, further comprising at least two elements for shaping the periphery of the filled filter.

14. A device as claimed in claim 10, wherein the filling tube comprises means for selectively regulating the inflow of effluent into the filter.

15. A device as claimed in claim 10, further comprising means for forming said filter in situ prior to the outlet of said filling tube from a web of said semi-permeable material.

16. A device as claimed in claim 10, wherein said filter moving means includes a plurality of endless belt conveyors positioned about said filter.

17. A device as claimed in claim 10, further comprising:
    an effluent preclarification stage upstream of said pump, said preclarification stage including an effluent settling tank wherein a sludge sediment and an effluent supernatant are formed, means for transporting the sludge sediment to said filtration device which comprises a first filtration stage;
    a second filtration stage;
    means for transporting said effluent supernatant to said second filtration stage;
    means for transporting the filtrate from said first filtration stage to said second filtration stage;
    a third filtration stage;
    means for transporting the filtrate from said second filtration stage to said third filtration stage; and means for combining the filter cake collected in said first, second and third filter stage and for disposing of the combined filter cake.

19. A device as claimed in claim 17, wherein said second and third filter stages comprise the same elements as said first filter stage.

19. A device as claimed in claim 18, wherein the pore size of the semi-permeable material in said third filter stage is smaller than the pore size of the semi-permeable material in said second filter stage, and the pore size of the semi-permeable material in said second filter stage is smaller than the pore size of the semi-permeable material in said first filter stage.

* * * * *

UNITED STATES PATENT OFFICE
CERTIFICATE OF CORRECTION

Patent No. 4,260,496     Dated April 7, 1981

Inventor(s) Ekkehard BEER

It is certified that error appears in the above-identified patent and that said Letters Patent are hereby corrected as shown below:

Column 5, line 40, kindly delete "2b" and insert instead -- 26b --.

Signed and Sealed this

Third Day of November 1981

[SEAL]

Attest:

Attesting Officer

GERALD J. MOSSINGHOFF

Commissioner of Patents and Trademarks